(12) United States Patent
Kim et al.

(10) Patent No.: US 10,665,915 B2
(45) Date of Patent: May 26, 2020

(54) BATTERY PACK

(71) Applicant: LG ELECTRONICS INC., Seoul (KR)

(72) Inventors: Jonghoon Kim, Seoul (KR); Jaecheol Hwang, Seoul (KR); Seokmin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 309 days.

(21) Appl. No.: 15/121,197

(22) PCT Filed: Feb. 23, 2015

(86) PCT No.: PCT/KR2015/001723
§ 371 (c)(1),
(2) Date: Aug. 24, 2016

(87) PCT Pub. No.: WO2015/126209
PCT Pub. Date: Aug. 27, 2015

(65) Prior Publication Data
US 2017/0012330 A1 Jan. 12, 2017

(30) Foreign Application Priority Data
Feb. 24, 2014 (KR) .................. 10-2014-0021168

(51) Int. Cl.
*H01M 10/6561* (2014.01)
*H01M 2/10* (2006.01)
(Continued)

(52) U.S. Cl.
CPC ..... *H01M 10/6561* (2015.04); *H01M 2/1077* (2013.01); *H01M 10/613* (2015.04); *H01M 10/615* (2015.04); *H01M 10/625* (2015.04); *H01M 10/663* (2015.04); *H01M 2220/20* (2013.01)

(58) Field of Classification Search
CPC . H01M 10/6561–6566; H01M 10/613; H01M 10/663; H01M 10/615; H01M 10/625; H01M 2/1077; H01M 2220/20
See application file for complete search history.

(56) References Cited

U.S. PATENT DOCUMENTS

2006/0090492 A1* 5/2006 Ahn .................... H01M 10/625
62/259.2
2012/0121959 A1* 5/2012 Yamada .................. B60K 1/04
429/100

FOREIGN PATENT DOCUMENTS

JP 06-261422 9/1994
JP 2005-183217 7/2005
(Continued)

OTHER PUBLICATIONS

International Search Report dated Jun. 1, 2015 for PCT Application No. PCT/KR2015/001723, 4 pages.

*Primary Examiner* — Eugenia Wang
(74) *Attorney, Agent, or Firm* — Fish & Richardson P.C.

(57) ABSTRACT

The present invention relates to a battery pack. The battery pack, according to one embodiment of the present invention, comprises: multiple cell modules which include cells generating electrical energy; a tray which supports the weight of the multiple cell modules; and a frame which divides the space for arranging the multiple cell modules, and which extends in the vehicle length direction and the vehicle width direction, forming a supply flow channel through which air flows.

17 Claims, 7 Drawing Sheets

(51) Int. Cl.
*H01M 10/625* (2014.01)
*H01M 10/613* (2014.01)
*H01M 10/615* (2014.01)
*H01M 10/663* (2014.01)

(56) References Cited

FOREIGN PATENT DOCUMENTS

| | | |
|---|---|---|
| JP | 2010-244877 | 10/2010 |
| JP | 2010-250984 | 11/2010 |
| JP | 2012-129058 | 7/2012 |

* cited by examiner (a)          (b)

BATTERY PACK

CROSS REFERENCE TO RELATED APPLICATIONS

This application is a U.S. National Phase Application under 35 U.S.C. § 371 of International Application PCT/KR2015/001723, filed on Feb. 23, 2015, which claims the benefit of Korean Application No. 10-2014-0021168, filed on Feb. 24, 2014, the entire contents of which are hereby incorporated by reference in their entireties.

TECHNICAL FIELD

The present invention relates to a battery pack and, more particularly, to a battery pack which provides driving power to an electric vehicle.

BACKGROUND ART

Recently, interest in technology using rechargeable secondary batteries as power sources of vehicles is on the rise. Although a nickel-metal hydride (Ni-MH) battery is mainly used as a secondary battery, use of a lithium ion battery is attempted now.

Medium or large-sized battery packs, formed by stacking a plurality of battery cartridges, have various battery cartridge stacking methods or connection methods and in order to execute these methods, various structures are required and large amount of labor is required.

A battery pack generates heat during discharge and such heat is a factor which shortens the lifespan of the battery pack and reduces efficiency of the battery pack. Further, when the temperature of the battery pack is excessively low, proper output may not be provided to a vehicle. Therefore, an apparatus to maintain a proper temperature of a battery pack is required.

DISCLOSURE

Technical Problem

Therefore, the present invention has been made in view of the above problems, and it is an object of the present invention to properly adjust the temperature of a battery pack.

It is a further object of the present invention to minimize energy necessary for temperature adjustment.

It is another object of the present invention to provide a structure which increases stiffness of a vehicle.

It is yet another object of the present invention to increase the capacity of a passenger compartment by reducing the size of a battery pack.

Additional advantages, objects, and features of the invention will be set forth in part in the description which follows and in part will become apparent to those skilled in the art upon examination of the following or may be learned from practice of the invention.

Technical Solution

In accordance with an aspect of the present invention, the above and other objects can be accomplished by the provision of a battery pack including a plurality of cell modules including cells to generate electric energy, a tray configured to support the weight of the cell modules, and a frame configured to divide a space for arranging the cell modules and extending in the length direction and the width direction of a vehicle to form supply flow channels of air.

The frame may include a center frame extending in the length direction of the vehicle and dividing the cell modules, and cross frames extending in the width direction of the vehicle and communicating with the center frame.

The frame may further include side frames extending in the length direction of the vehicle, disposed at the edge of the frame, communicating with the cross frames and provided with inlets to inhale external air.

The frame may be provided with an inlet to inhale external air, and the inlet may be formed on the center frame.

The frame may be provided with an inlet to inhale external air, and the center frame may include a first center frame part disposed close to an inlet and a second center frame part disposed more distant from the inlet than the first center frame part and having a smaller diameter than the diameter of the first center frame part.

The frame may further include side frames extending in the length direction of the vehicle, disposed at the edge of the frame and communicating with the cross frames.

The frame may be provided with inlets to inhale external air and a plurality of outlets opened toward the cell modules to inject air, and the diameters of the outlets may be gradually decreased as the outlets becomes distant from the inlets.

The battery pack may further include a bracket to fix the cell modules to the frame, the height of the frame may be lower than the height of the cell modules, and the bracket may be bent at least once and fastened to the upper surface of the frame.

The battery pack may further include diaphragms disposed between the cell modules to prevent air discharged from the cross frames from flowing to the center frame.

The cell modules may be provided with flow passages formed between the cells parallel to the cross frames so that air flows along the flow passages, the diaphragms may be respectively disposed between the cell modules, and at least one flow passage may be formed between the diaphragms.

The diaphragm may be surrounded by a rim part formed of a soft material and located at the edge of the diaphragm, and the rim part may intercept air flowing between the diaphragm and the cell module.

The battery pack may further include a cover disposed on the frame and the cell modules, return flow channels along which air discharged from the frame flows may be formed on the frame, and the cover may partition the return flow channels from the outside.

The battery pack may further include an internal air duct in which internal air supplied from the return flow channels flows, an external air duct in which external air introduced into the battery pack through the cover flows, an exhaust duct configured to guide air introduced from the internal air duct to the outside of the cover, and an intake duct configured to guide at least one of internal air discharged from the internal air duct and external air discharged from the external air duct to the frame.

The battery pack may further include a flow channel switching unit configured to connect the internal air duct and the intake duct so as to connect the return flow channels and the supply flow channels.

The center frame may include supply parts including openings communicating with the cross frames and forming the supply flow channels, and distribution guides to guide air discharged from the openings to the cross frames.

The distribution guide may include a separation plate configured to divide the supply flow channel and an interception plate formed at the end of the separation plate to prevent air discharged from the opening from flowing in the length direction of the supply part.

The size of at least one of the distribution guides and the openings may be increased, as the distribution guides and the openings become distant from the intake duct to inhale external air into the cover.

The details of other aspects are included in the following detailed description and the drawings.

Advantageous Effects

A battery pack in accordance with the embodiments of the present invention may have one or more effects described below.

First, the temperature of the battery pack may be maintained in the optimum state.

Second, cooled or heated air is re-used and thus energy required for temperature adjustment is saved.

Third, a frame surrounding the battery pack is disposed and thus vehicle stiffness is increased.

Fourth, the frame is disposed on the side surface of a battery and thus the size of the battery pack is reduced and the capacity of a passenger compartment of a vehicle is increased.

Effects of the present invention are not limited thereto, and other effects which are not stated herein will be readily understood by those skilled in the art from the claims.

BEST MODE

Figure 1:
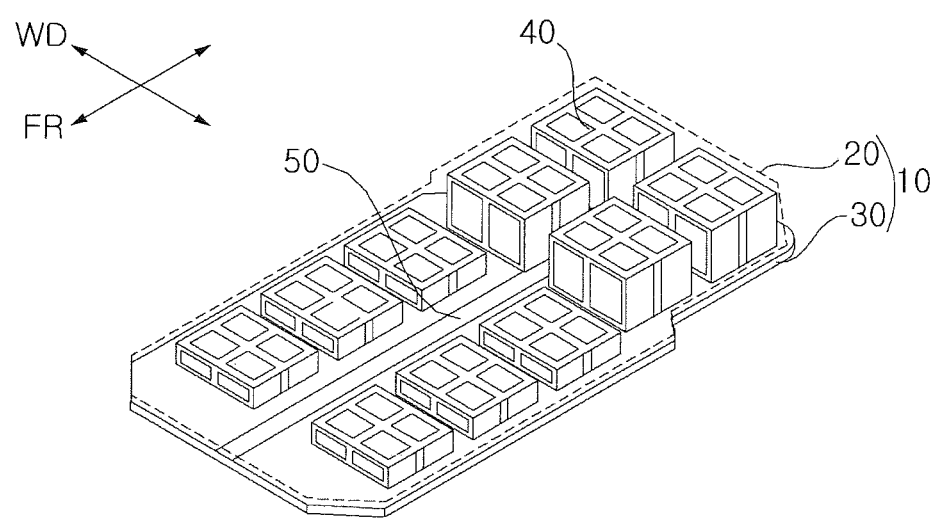
FIG. 1 is a perspective view of a battery pack in accordance with one embodiment of the present invention.

The above and other objects, features and other advantages of the present invention will be more clearly understood from the following detailed embodiments taken in conjunction with the accompanying drawings. However, while the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments within the spirit and scope of the invention as defined by the appended claims. Throughout the specification, the same or similar elements are denoted by the same reference numerals even though they are depicted in different drawings.

Hereinafter, the present invention will be described with reference to the drawings to describe battery packs in accordance with embodiments of the present invention.

FIG. 1 is a perspective view of a battery pack in accordance with one embodiment of the present invention. WD indicates a length direction of a vehicle or a forward or backward direction of the vehicle, and RL indicates a width direction of the vehicle.

With reference to FIG. 1, a battery pack in accordance with one embodiment of the present invention includes a plurality of cell modules 40 including cells to generate energy, a tray 30 configured to support the weight of the cell modules 40, and a frame 50 configured to divide a space for arranging the cell modules 40 and extending in the length direction and the width direction of a vehicle to form supply flow channels along which air flows.

The cell modules 40 include cells which are secondary batteries (lithium ion batteries, etc.). The cell modules 40 include a plurality of thin plate-shaped cells. The cells are stacked and electrically connected in series. A plurality of cell modules 40 is electrically connected in series. The cell module 40 has an assembly structure in which a plurality of cells is vertically stacked. The cell module 40 has a structure in which a plurality of cells is disposed in parallel in the thickness direction. The cell module 40 is formed by disposing a plurality of cells in parallel in the horizontal direction or the vertical direction. The cell modules 40 are spaced from each other, thus being divisionally disposed. The cell modules 40 are disposed in the same pattern at the left and right sides based on the center of the vehicle.

The frame 50 distributes load applied to vehicle body members and absorbs crash energy during collision of a vehicle. The frame 50 is formed in an approximately lattice shape. The cell modules 40 are inserted into spaces formed by the frame 50. The inside of the frame 50 forms the spaces through which air may flow. The frame 50 forms supply flow channels SF. In the supply flow channels SF, air supplied from the outside or air circulated within the battery pack flows. Air flowing along the supply flow channels SF absorbs thermal energy from the cell modules 40.

The battery pack is located at the central part of the bottom of a vehicle body. The battery pack is disposed between a front rotary shaft and a rear rotary shaft. The bottom of the vehicle body is disposed under a passenger compartment. Within the passenger compartment, an instrument panel, a central console box, and seats are disposed. The battery pack is disposed at the outside of the passenger compartment under the bottom of the vehicle body. The battery pack corresponds to a fuel tank of a vehicle including an internal combustion engine and repeats charge to increase a battery capacity and discharge to decrease the battery capacity. The battery pack generates heat during charge and discharge.

The battery pack includes an inverter and a DC-DC converter. The inverter converts DC power of the battery pack into 3-phase AC power and then supplies the converted 3-phase AC power to a motor 170. The DC-DC converter drops voltage of DC power of the battery pack and supplies the DC power having dropped voltage to electric devices, etc. A battery pack in accordance with one embodiment of the present invention includes a plurality of cell modules 40 including cells to generate energy, a cover 20 configured to cover the cell modules 40 so as to form return flow channels BF along which air flows between the cell modules 40 and the cover 20, and a frame 50 configured to divide the cell modules 40 and to form supply flow channels SF along which air having a lower temperature than that of air flowing along the return flow channels BF flows.

A tray 30 may be disposed opposite vehicle body members and be fastened to the vehicle body members. The tray 30 may be fastened to a bracket 100. The bracket 100 may be connected to the cover 20 or the tray 30. The cover 20 may be fastened to the edge of the tray 30 by bolts. The cover 30 covers the cell modules 40.

The tray 30 supports the cell modules 40. The tray 30 is combined with the cover 20. The tray 30 may be a metal plate. The tray 30 fixes and supports the frame 50. The tray 30 and the cover 20 may contain glass fiber as a reinforcing material so as to increase strength and stiffness and be formed of fiber reinforced plastic (FRP) having electrical insulation. The return flow channels BF are formed between the cover 20 and the frame 50.

The supply flow channels SF are formed within the frame 50. The return flow channels BF are spaces in which air discharged from the supply flow channels SF flows. Air discharged from the supply flow channels SF flows in the return flow channels BF while exchanging heat with the cell modules 40.

Figure 2:
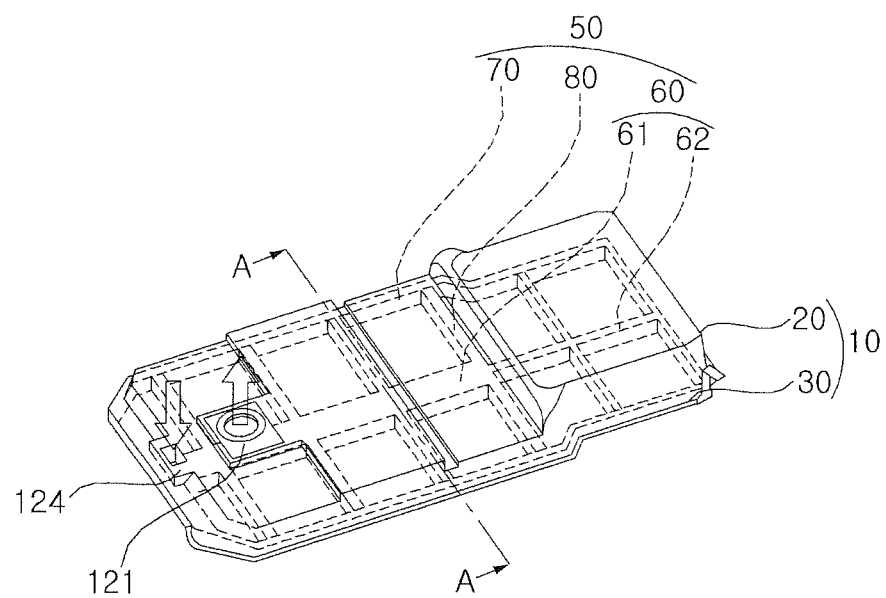
FIG. 2 is a perspective view of a frame in accordance with one embodiment of the present invention.
Figure 3:
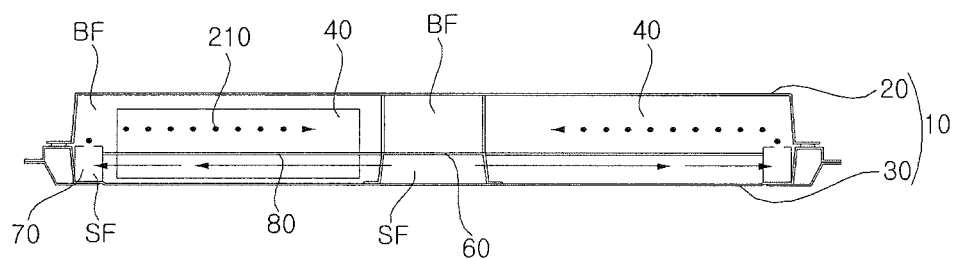
FIG. 3 is a cross-sectional view taken along line A-A of FIG. 2.
Figure 4:
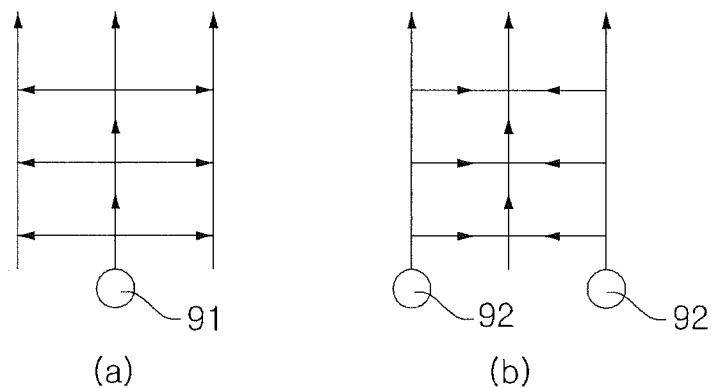
FIG. 4 illustrates air flows along the frame according to positions of inlets.
Figure 5:
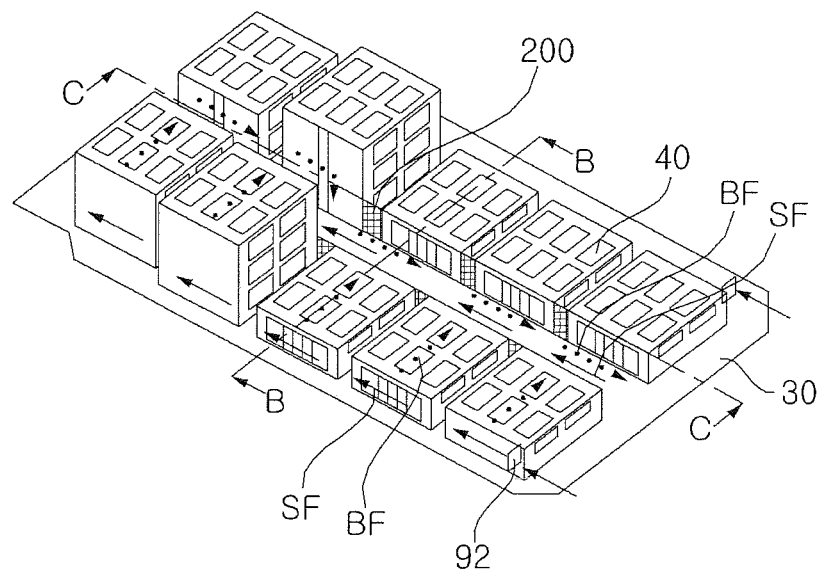
FIG. 5 is a view illustrating supply flow channels and return flow channels in FIG. 4(b).

FIG. 2 is a perspective view of the frame in accordance with one embodiment of the present invention. FIG. 3 is a cross-sectional view taken along line A-A of FIG. 2. FIG. 4 illustrates air flows along the frame according to positions of inlets. FIG. 5 is a view illustrating the supply flow channels SF and the return flow channels BF in FIG. 4(b).

With reference to FIGS. 2 to 5, the frame 50 includes a center frame 60 extending in the length direction of the vehicle and dividing the cell modules 40, cross frames 80 extending in the width direction of the vehicle and communicating with the center frame 60, and side frames 70 extending in the length direction of the vehicle, disposed at the edge of the frame 50 and communicating with the cross frames 80.

The center frame 60 and the side frames 70 are disposed in the longitudinal direction, and the cross frames 80 are disposed in the transverse direction and connect the center frame 60 and the side frames 70. A plurality of side frames 70 may be disposed at the left and right sides of the frame 50, and the center frame 60 is disposed between the side frames 70 and divides the battery pack into left and right portions. When side collusion occurs, load is transmitted to side members 110 or cross members.

Load transmitted to the side members 110 or the cross members is transmitted to the frame 50 disposed within the battery pack. A plurality of cross frames 80 is provided within the battery pack, disposed in the width direction of the vehicle and thus distributes load applied from the side. Further, the cross frames 80, the center frame 60 and the side frames 70 form flow channels provided therein and are thus easily deformed during load transmission. The frame 50 absorbs crash energy due to deformation of the frame 50. The frame 50 may be formed of a metal material (for example, a steel plate) having sufficient strength to withstand impact applied to the vehicle. The frame 50 may be formed by bending or welding a metal plate.

FIG. 4(a) is a view illustrating an air flow if an inlet 91 is formed on the center frame 60, and FIG. 4(b) is a view illustrating an air flow if inlets 92 are formed on the side frames 70.

The frame 50 is provided with inlets 92 into which external air is inhaled, and the inlets 92 are formed on the side frames 70. The inlets 92 communicate with an intake duct 124. Air introduced into the inlets 92 flows to the cross frames 80 through the side frames 70. Air introduced into the cross frames 80 flows to the center frame 60. The frame 50 is provided with an inlet 91 into which external air is inhaled, and the inlet 91 is formed on the center frame 60.

Air introduced into the inlet 91 flows to the cross frames 80 through the center frame 6-0. Air introduced into the cross frames 80 flows to the side frames 70. The frame 50 includes outlets 95 formed on the surfaces thereof being opposite the cell modules 40. Air flowing along the supply flow channels SF is injected to the cell modules 40 through the outlets 95. The frame 50 is provided with the inlets 91, 92 into which external air is inhaled, and the center frame 60 includes a first center frame part 61 disposed close to the inlets 91, 92 and a second center frame part 62 disposed more distant from the inlets 91, 92 than the first center frame part 61 and having a smaller diameter than the diameter of the first center frame part 61. For example, if the inlets 91, 92 are formed at the front portion of the center frame 60 or the front portions of the side frames 70, the first center frame part 61 is disposed at the front portion of the center frame 60 and the second center frame part 62 is disposed at the rear portion of the center frame 60.

The first center frame part 61 and the second center frame part 62 communicate with each other. The first center frame part 61 may be provided with inlets 91, 92. Since the diameter of the second center frame part 62 is smaller than the diameter of the first center frame part 61, the diameter of the supply flow channel SF in the second center frame part 62 is smaller than the diameter of the supply flow channel SF in the first center frame part 61. The diameter of the supply flow channel is decreased and thus a flow velocity of air is increased. If the flow velocity of air is increased, an injection distance of air is increased, as compared to the case that the flow velocity of air is low. Therefore, air injection amounts and air injection distances at the first center frame part 61 close to the inlets 91, 92 and the second center frame part 62 distant from the inlets 91, 92 are uniformly maintained.

Flow directions of air along the return flow channels BF and the supply flow channels SF may be opposite each other with respect to the frame 50. The intake duct 124 and an internal air duct 121 are preferably disposed close to each other even if the disposition may vary according to the position of the internal air duct 121. Air flowing along the intake duct 124 is supplied to the frame 50 through the inlets 91, 92. Air flows in the frame 50 so as to become far away from the inlets 91, 92. Air flowing along the supply flow channels SF is discharged through the outlets 95. Discharged internal air flows to the internal air duct 121 through the return flow channels BF.

Since the internal air duct 121 and the intake duct 124 and are disposed close to each other, air flowing along the supply flow channels SF and air flowing along the return flow channels BF flow in opposite directions.

Figure 6:
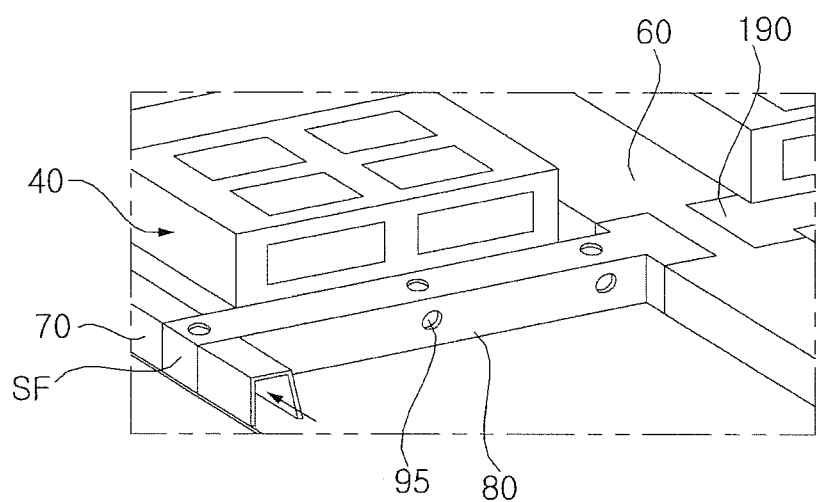
FIG. 6 is view illustrating connection relations of the frame.
Figure 7:
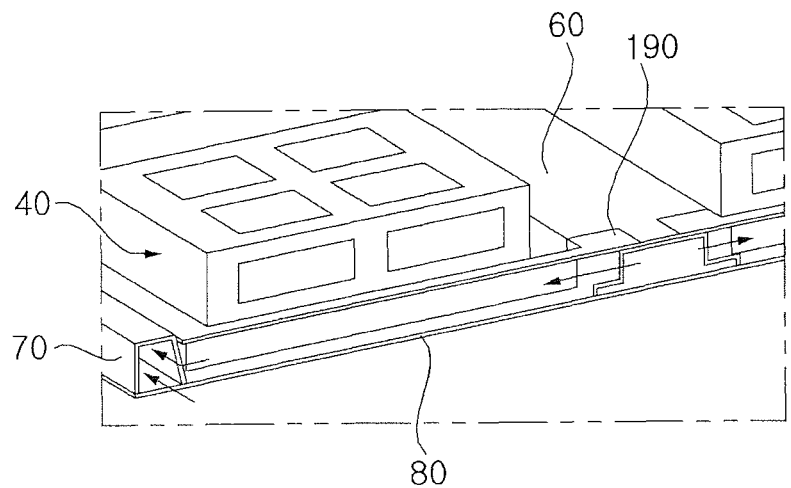
FIG. 7 is a longitudinal-sectional view of the frame of FIG. 6.
Figure 8:
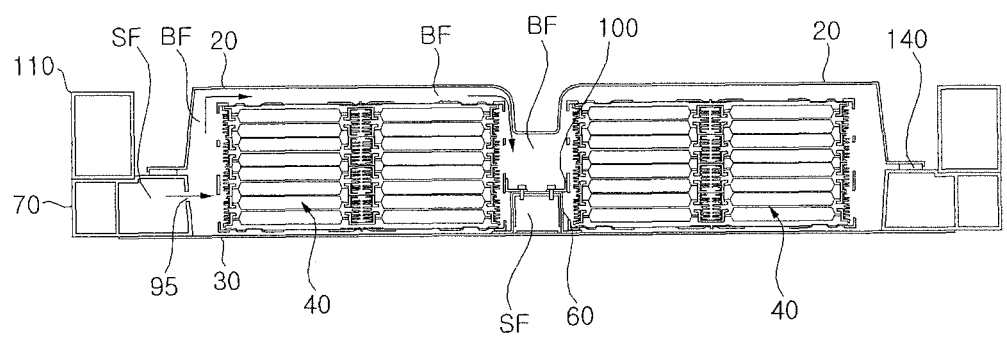
FIG. 8 is a cross-sectional view taken along line B-B of FIG. 5.

FIG. 6 is a view illustrating connection relations of the frame. FIG. 7 is a longitudinal-sectional view of the frame of FIG. 6. FIG. 8 is a cross-sectional view taken along line B-B of FIG. 5.

With reference to FIGS. 6 and 7, the frame 50 is provided with the inlets 91, 92 to inhale external air and the outlets 95 opened toward the cell modules 405 to inject air, and the diameters of the outlets 95 are gradually decreased as the outlets 95 becomes distant from the inlets 91, 92. Since the diameters of the outlets 95 are decreased, the diameters of the supply flow channels SF are decreased. Since the diameters of the supply flow channels SF are decreased, the flow velocity of air is increased. If the flow velocity of air is increased, the injection distance of air is increased, as compared to the case that the flow velocity of air is low. Therefore, air injection amounts and air injection distances at the first center frame part 61 close to the inlets 91, 92 and the second center frame part 62 distant from the inlets 91, 92 are uniformly maintained.

The frame 50 protrudes upwardly from the tray 30 and faces the side surfaces of the cell modules 40. The frame 50 is fixed and supported by the tray 30. The frame 50 is combined with the tray 30 by bolting or spot welding. At least the surface of the tray 30 contacting the cell modules 40 and the frame 50 is flattened. The frame 50 surrounds a part of the side surfaces of the cell modules 40. The frame 50 is disposed at the front, rear, left, and right surfaces of the cell modules 40. The front and rear surfaces of the cell modules 40 are surrounded by the cross frames 80.

One of the left and right surfaces of the cell module 40 is surrounded by the side frame 70 and the other of the left and right surfaces of the cell module 40 is surrounded by the center frame 60. However, if the height of the frame 50 is lower than the height of the cell modules 40, the frame 50 may surround a part of the cell module 40. The frame 50 includes the outlets 95 formed on the surfaces thereof being opposite the cell modules 40.

The battery pack in accordance with one embodiment of the present invention includes the bracket 100 to fix the cell modules 40 to the frame 50, the height of the frame 50 is lower than the height of the cell modules 40, and the bracket 100 is bent at least once and thus fastened to the upper surface of the frame 50. The frame 50 and the cell modules 40 are disposed on the tray 30. The height of the frame 50 is lower than the height of the cell modules 40.

The bracket 100 is connected to the upper surfaces or the side surfaces of the cell modules 40. The bracket 100 is connected to the upper surface of the frame 50. The bracket 100 may have an 'L' shape. The bracket 100 may connect the frame 50 and the cell modules 40 using bolts and nuts. The frame 50 is formed in a lattice shape and the cell modules 40 are inserted into the frame 50. The frame 50 is formed in a lattice shape. The frame 50 forms a plurality of rectangular parallelepiped spaces. The frame 50 prevents elastic deformation of the battery pack and increases stiffness of the overall battery pack.

The frame 50 may include the center frame 60 extending in the length direction of the vehicle and the cross frames 80 extending in the width direction of the vehicle and communicating with the center frame 60, the center frame 60 and the cross frames 80 may be perpendicular to each other, and the cross frames 80 may be parallel to one another. The side frames 70 may form flanges 190.

The flanges 190 may extend in the length direction of the side frames 70 and thus cover the upper surface of the center frame 60, or may be bent in the width direction of the side frames 70 and thus contact the side walls of the center frame 60. The cross frames 80 extend in the transverse direction and support load applied from the side of the vehicle. The center frame 60 extends in the forward and backward directions and supports load applied from the front or rear of the vehicle. Vehicle body members include a pair of side members 110 extending in the forward and backward directions of the vehicle and a plurality of cross members extending in the width direction of the vehicle. The side members and the cross members are connected to each other.

The battery pack may be disposed in a space divided by the side members and the cross members. The side members may be fastened to the side frames 70. The side members 110 may be fastened to the tray 30. The side members 110 transmit load applied from the side to the tray 30 or the side frames 70.

The tray 30 may be disposed opposite vehicle body members and be fastened to the vehicle body members. The tray 30 may be fastened to the bracket 100. The tray 30 may support the cell modules 40. The tray 30 is combined with the cover 20. The tray 30 may be a metal plate. The tray 30 fixes and supports the frame 50. The tray 30 and the cover 20 may contain glass fiber as a reinforcing material so as to increase strength and stiffness and be formed of fiber reinforced plastic (FRP) having electrical insulation.

Load applied to the side member 110 may be transmitted to the side frame 70. The side member 110 and the side frame 70 may be vertically stacked and thus divisionally support applied load. The cross frames 80 may be disposed in parallel and thus divisionally support load applied in the width direction of the vehicle. The frame 50 may form the supply flow channels SF therein and be deformed according to applied load to absorb impact energy.

The cover 20 is disposed on the frame 50 and the cell modules 40, the return flow channels BF along which air discharged from the frame 50 flows are formed on the frame 50, and the cover 20 partitions the return flow channels BF from the outside. The frame 50 is disposed between one cell module 40 and another cell module 40. The return flow channels BF are formed on the frame 50. The lower portions of the return flow channels BF are divided by the frame 50, the side surface of the return flow channels BF are divided by the cell modules 40, and the upper portions of the return flow channels BF are divided by the cover 20. The cover 20 and the tray 30 are fastened to each other, thus sealing the inside of the battery pack. Air discharged from the outlets 95 flows through the return flow channels BF. The cover 20 and the frame 50 form a plurality of flow channels within the battery pack, and the flow channels are isolated from each other in the vertical direction. The flow channels are disposed in a 2-stage structure.

The battery pack in accordance with one embodiment of the present invention includes a sealing member 140 disposed between the cover 20 and the tray 30 to block an air flow. The sealing member 140 may be formed of rubber, silicon, non-woven fabric, etc. The sealing member 140 fills a gap between the cover 20 and the tray 30 and thus blocks an air flow. Since air is introduced into the battery pack through an intake fan 128, air pressure of the inside of the battery pack is higher than air pressure of the outside of the battery pack. Therefore, if there is a gap between the cover 20 and the tray 30, cooled air is discharged to the outside of the battery pack therethrough. The sealing member 140 may be disposed between the cover 20 and the tray 30, or be disposed between the side frames 70 and the cover 20. The sealing member 140 prevents air flowing along the return flow channels BF from being discharged to the outside of the battery pack.

Figure 9:
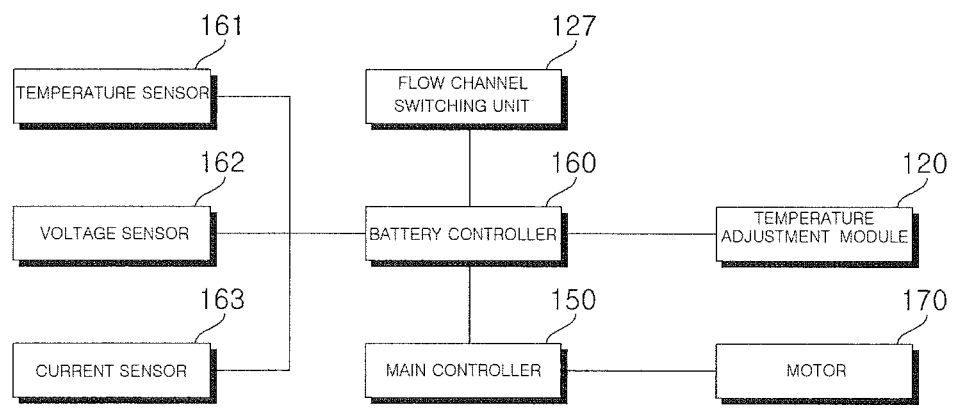
FIG. 9 is a block diagram illustrating a battery controller and peripheral elements.
Figure 10:
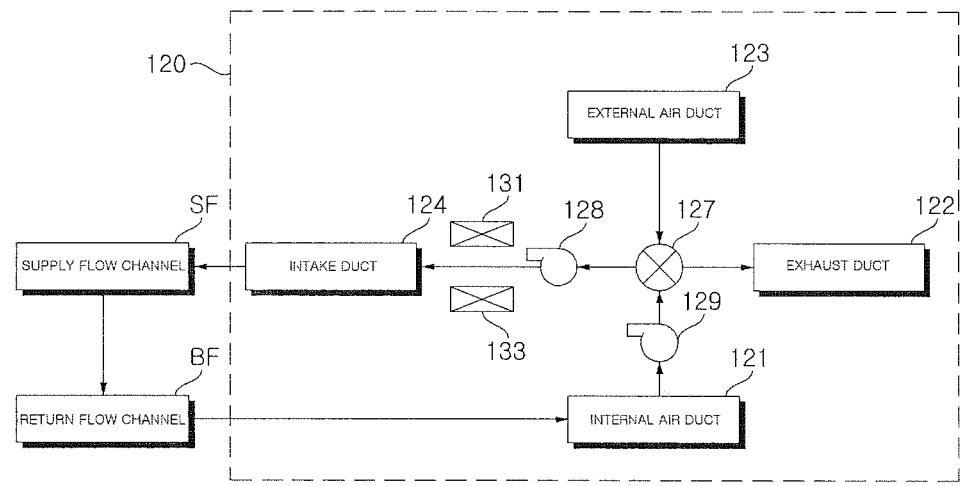
FIG. 10 is a block diagram illustrating air circulation flowing along a temperature adjustment module and the frame.

FIG. 9 is a block diagram illustrating a battery controller and peripheral elements. FIG. 10 is a block diagram illustrating air circulation flowing along a temperature adjustment module and the frame.

With reference to FIGS. 9 and 10, the battery pack in accordance with one embodiment of the present invention includes an internal air duct 121 in which internal air supplied from the return flow channels BF flows, an external air duct 123 in which external air introduced into the battery pack through the cover 20 flows, an exhaust duct 122 which guides air introduced from the internal air duct 121 to the outside of the cover 20, and an intake duct 124 which guides at least one of internal air discharged from the internal air duct 121 and external air discharged from the external air duct 123 to the frame 50.

Internal air is air which has exchanged heat with the cell modules 40 at least once. External air is air which does not exchange heat with the cell modules 40. Internal air flows along the return flow channels BF. External air flows along the external air duct 123. An intake fan 128 is disposed in the intake duct and inhales air. An exhaust fan 129 is disposed in the exhaust duct 122 and discharges internal air to the outside.

The battery pack in accordance with one embodiment of the present invention includes a flow channel switching unit 127 which connects the internal air duct 121 and the intake duct 124 to connect the return flow channels BF and the supply flow channels SF. A battery controller 160 is disposed within the battery pack. The battery controller 160 is connected to a main controller 150. The battery controller 160 controls the capacity, temperature and voltage of the cell modules 40. The battery controller 160 receives signals from a temperature sensor 161, a voltage sensor 162 and a current sensor 163. The battery controller 160 processes the received signals and thus acquires battery capacity information, battery temperature and battery voltage information.

A CAN cable connects the battery pack to the main controller 150. The CAN cable is a two-way communication line. The CAN cable transmits signals among the battery pack, the main controller 150 and an air conditioner 130. The main controller 150 issues commands to the battery pack so as to execute discharge control (reverse control) or charge control (rapid charge control, general charge control or regenerative control). The flow channel switching unit 127 receives a signal from the battery controller 160 or the main controller 150. The flow channel switching unit may include a plurality of valves.

The flow channel switching unit executes a circulation mode in which internal air is repeatedly supplied to the frame 50 by closing the exhaust duct 122 and the external air duct 123 and an external air mode in which external air is supplied to the frame 50 by opening the external air duct 123. The battery controller 160 controls the flow channel switching unit 127 by a temperature difference between external air and internal air. For example, the battery controller 160 may execute the external air mode, if the temperature of external air is lower than the temperature of internal air.

The battery controller 160, if the temperature of external air is sufficiently low, cools the cell modules 40 using only external air without driving of a separate cooling device. The battery controller 160, if the temperature of external air is higher than the temperature of internal air, may block introduction of external air and execute the circulation mode. The battery pack in accordance with one embodiment of the present invention includes the air conditioner 130 which adjusts the temperature of air by absorbing energy.

The air conditioner 130 may supply cold air or warm air to the battery pack. The air conditioner 130 includes an evaporator 133 and a positive temperature coefficient (PTC) heater 131 in which a refrigerant is circulated. The evaporator 133 generates cold air by absorbing thermal energy from air. The PTC heater 131 generates warm air by supplying thermal energy to air. The air conditioner 130 may exchange heat with air in the intake duct 124. The air conditioner 130 may include a heating unit and a cooling unit. The heating unit may be the PTC heater 131 and the cooling unit may be the evaporator 133.

The battery pack in accordance with one embodiment of the present invention includes a casing 10 forming the external appearance of the battery pack, the frame 50 disposed within the casing 10 and forming lattice-shaped spaces, the cell modules 40 inserted into the spaces formed by the frame 50 and including cells to generate electric energy, and a temperature adjustment module 120 to inhale air within the casing 10 and then to inject the inhaled air into the frame 50.

The battery pack includes the casing 10, the cell modules 40, a service plug, etc. The casing 10 surrounds the cell modules 40. The service plug is a switch which mechanically breaks a current circuit of the battery by manual operation. The service plug is manually operated when a current module or an inverter is checked, repaired and parts thereof are replaced. The casing 10 includes the tray 30 and the cover 20. The cover 20 and the tray 30 are combined with each other, thus sealing the inside of the battery pack.

The temperature adjustment module 120 includes the internal air duct 121 in which internal air supplied from the return flow channels BF flows, the external air duct 123 in which external air introduced into the battery pack through the cover 20 flows, the exhaust duct 122 which guides air introduced from the internal air duct 121 to the outside of the cover 20, the intake duct 124 which guides at least one of air supplied from the internal air duct 121 and air supplied from the external air duct 123 to the frame 50, the intake fan 128 provided in the intake duct 124, the exhaust fan 129 provided in the exhaust duct 122, and the flow channel switching unit 127 to switch the flow channels between the ducts.

The flow channel switching unit 27 adjusts whether or not external air is inhaled or internal air is circulated by controlling the flow channels. External air may flow to the frame 50 and thus cool or heat the cell modules 40. Internal air, i.e., air which has exchanged heat with the cell modules 40 at least once, cools or heats the cell modules 40.

Figure 11:
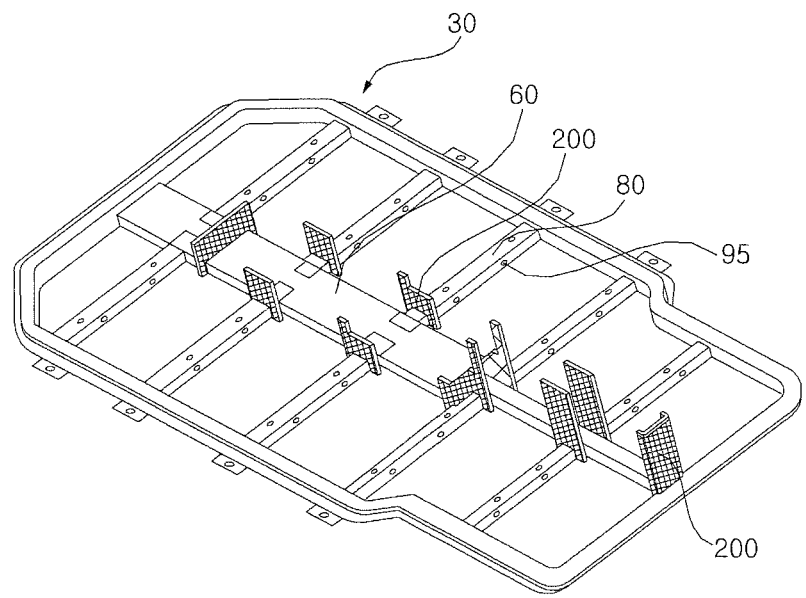
FIG. 11 is a view illustrating disposition of diaphragms in the battery pack in accordance with one embodiment of the present invention.
Figure 12:
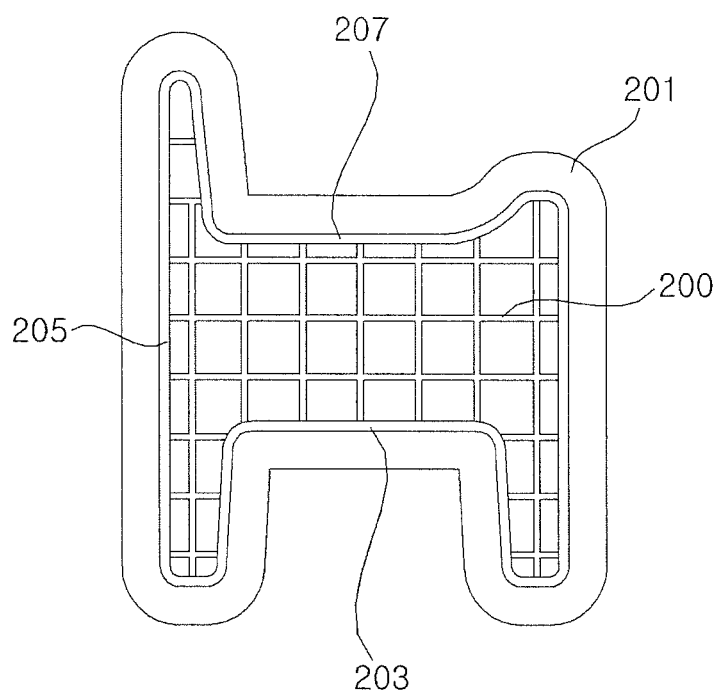
FIG. 12 is a view illustrating a diaphragm in accordance with one embodiment of the present invention.
Figure 13:
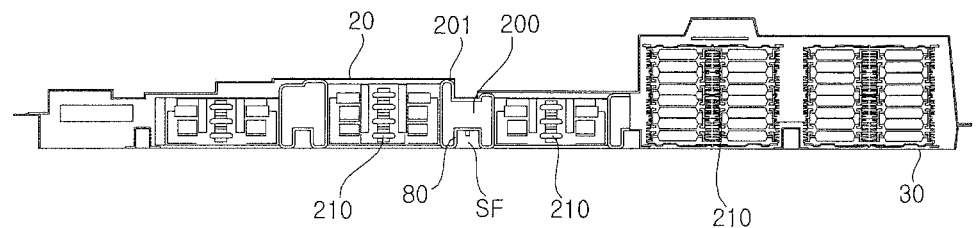
FIG. 13 is a cross-sectional view taken along line C-C of FIG. 5.

FIG. 11 is a view illustrating disposition of diaphragms in the battery pack in accordance with one embodiment of the present invention. FIG. 12 is a view illustrating a diaphragm in accordance with one embodiment of the present invention. FIG. 13 is a cross-sectional view taken along line C-C of FIG. 5.

The battery pack in accordance with one embodiment of the present invention includes the side frames 70 extending in the length direction of the vehicle, disposed at the edge of the battery pack and communicating with the cross frames 80. The cross frames 80 communicate with the center frame 60. Air discharged from the center frame 60 flows to the side frames 70 through the cross frames 80. The cross frames 80 and the side frames may form the outlets 95 to discharge air. If the side frames 70 are omitted, the cross frames 80 are connected to the ends of the tray 30.

Air discharged from the outlets 95 exchanges heat with the cell modules 40 and then flows to the return flow channels BF. Diaphragms 20, which will be described later, prevent air, discharged from the outlets 95, from flowing back to the center frame 60. Air discharged from the outlets 95 surrounds the cell modules 40 and flows to flow passages 210, which will be described later. Air discharged from the outlets 95 flows to the exhaust fan 129. The exhaust fan 129 forms low pressure. The return flow channels BF are formed in the direction of the exhaust fan 129. The return flow channels BF are formed on the center frame 60. The return flow channels BF communicate with the flow passages 210.

The battery pack in accordance with one embodiment of the present invention includes the diaphragms 200 disposed between the cell modules 40 to prevent air discharged from the cross frames 80 from flowing to the center frame 60.

The diaphragms 200 divide the return flow channels BF. The diaphragms 200 prevent air discharged from the outlets 95 from flowing along the return flow channels BF prior to heat exchange with the cell modules 40. The diaphragms 200 are disposed between the cell modules 40. Lower ends 203 of the diaphragms 200 face the cross frames 80, side surfaces 205 of the diaphragms 200 are opposite the cell modules 40, and upper ends 207 of the diaphragms 200 face the cover 20. However, since the upper ends of the cell modules 40 may form separation gaps with the cover 20, a part of air discharged from the outlets 95 may flow to the gaps between the cover 20 and the cell modules 40.

The cell modules 40 are provided with the flow passages 210 which are formed between a plurality of cells parallel to the cross frames 80 so that air flows along the flow passages 210, the diaphragms 200 are respectively disposed between the cell modules 40, and at least one flow passage 210 is formed between the diaphragms 200.

The flow passages 210 are formed between the cells. In the cell module 40, a plurality of cells is vertically stacked so as to form two groups, and the flow passage 210 is formed between the two groups. The cell module 40 is formed such that a designated gap is formed therein so as to form the flow passage 210 in the middle of the cell module 40. A cooling fin may be disposed in the flow passage 210. The respective cells may exchange heat with the cooling fin. Air flowing along the flow passage 210 exchanges heat with the cells through the cooling fin.

The diaphragm 200 is surrounded by a rim part 201 formed of a soft material and located at the edge of the diaphragm 200, and the rim part 201 blocks air flowing between the diaphragm 200 and the cell module 40. Although the rim part 201 is preferably formed of a soft material, such as rubber or silicon, any member which may fill a gap between the diaphragm 200 and the cell module 40 may be used. For example, the rim part 201 may be a member coupled with the gap between the diaphragm 200 and the cell module 40. A groove is formed at the inner surface of the rim part 201 and the diaphragm 200 may be combined with the rim part 201 by inserting the diaphragm 200 into the groove of the rim part 201.

Figure 14:
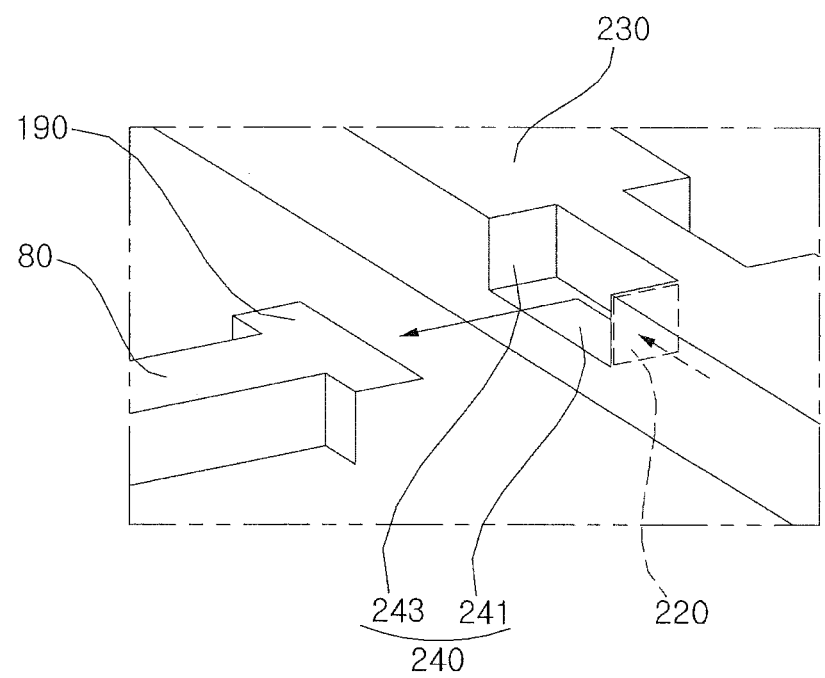
FIG. 14 is a perspective view illustrating an opening and a distribution guide formed on a center frame.

FIG. 14 is a perspective view illustrating an opening 220 and a distribution guide 240 formed on the center frame. Arrows in this figure indicate change of the flow direction of air, flowing along the center frame 60, to the cross frame 80.

The center frame 60 includes supply parts 230 including openings 220 communicating with the cross frames 80 and forming the supply flow channels SF, and distribution guides 240 to guide air discharged from the openings 220 to the cross frames 80.

The opening 220 is formed on the center frame 60. The supply part 230 is disposed between the cell modules 40 and thus forms the supply flow channel SF. The distribution guide 240 may be formed by pressing the supply part 230 or by applying compressive force to the supply part 230. The distribution guide 240 may have a shape depressed into the supply part 230. The opening 220 communicates with the cross frame 80. The opening 220 may be formed opposite the length direction of the center frame 60.

The distribution guide 240 distributes air discharged from the opening 220. A distribution amount may vary according to the size of the distribution guide 240. Since air pressure at a part of the center frame 60 located close the intake duct 124 to inhale air is high, the distribution guide 240 and the opening 220 at such a part preferably have small sizes. At a part of the center frame 60 located distant from the intake duct 124, the sizes of the distribution guide 240 and the opening 220 may be increased so as to increase an air injection amount. The size of at least one of the distribution guides 240 and the openings 220 is increased, as the distribution guides 240 and the openings 220 become distant from the intake duct 124 to inhale external air into the cover 20.

The distribution guide 240 includes a separation plate 241 to divide the supply flow channel SF, and an interception plate 243 formed at the end of the separation plate 241 to prevent air discharged from the opening 220 from flowing in the length direction of the supply part 230.

The separation plate 241 may constitute a portion of the supply part 230 and be a bent part by applying compressive force to the portion of the supply part 230. The separation plate 241 may have a shape depressed into the supply part 230. Therefore, due to formation of the separation plate 241, the cross-sectional area of the supply flow channel SF is reduced. The separation plate 241 may extend in the forward and backward directions of the vehicle. The separation plate 241 may have an 'L'-shaped cross section.

One side of the separation plate 241 extends from the opening 220. The interception plate 243 is formed at the other side of the separation plate 241. The width and height of the interception plate 243 may be the same as the width and height of the separation plate 241. The interception plate 243 may have a rectangular shape. The separation plate 241 is formed opposite to the opening 220. Air discharged from the opening 220 collides with the interception plate 243 and flows to the cross frame 80. The flange 190 may be disposed above the separation plate 241.

Although the preferred embodiments of the present invention have been disclosed for illustrative purposes, these embodiments do not limit the technical scope and spirit of the invention. Those skilled in the art will appreciate that various modifications, additions and substitutions are possible, without departing from the scope and spirit of the invention as disclosed in the accompanying claims.

The invention claimed is:

1. A battery pack comprising:
   a plurality of cell modules including cells to generate electric energy;
   a tray configured to support the weight of the cell modules;
   a frame configured to divide a space for arranging the cell modules and that is configured to extend in a length direction and a width direction of a vehicle to form supply flow channels of air; and
   a cover disposed on the frame and the cell modules, wherein return flow channels along which air discharged from the frame flows are formed on the frame, and the cover is configured to partition the return flow channels from the outside,
   wherein:
   the frame is provided with inlets that are configured to inhale external air, and a plurality of outlets, opened toward the cell modules, that are configured to inject air; and
   a diameter of the outlets are gradually decreased as the outlets become distant from the inlets.

2. The battery pack according to claim 1, wherein the frame includes:
a center frame that is configured to extend in the length direction of the vehicle and divide the cell modules; and
cross frames that are configured to extend in the width direction of the vehicle and communicate with the center frame.

3. The battery pack according to claim 2, wherein the frame further includes side frames extending in the length direction of the vehicle, disposed at an edge of the frame, communicating with the cross frames and provided with the inlets to inhale external air.

4. The battery pack according to claim 2, wherein inlets are formed on the center frame.

5. The battery pack according to claim 2, wherein the center frame includes:
a first center frame part disposed close to an inlet; and
a second center frame part disposed more distant from the inlet than the first center frame part and that is configured to have a smaller diameter than the diameter of the first center frame part.

6. The battery pack according to claim 2, wherein the frame further includes side frames extending in the length direction of the vehicle, disposed at an edge of the frame and communicating with the cross frames.

7. The battery pack according to claim 2, further comprising diaphragms disposed between the cell modules to prevent air discharged from the cross frames from flowing to the center frame.

8. The battery pack according to claim 7, wherein:
the cell modules are provided with flow passages formed between the cells parallel to the cross frames so that air flows along the flow passages;
the diaphragms are respectively disposed between the cell modules; and
the flow passages are formed between the diaphragms.

9. The battery pack according to claim 7, wherein:
each diaphragm is surrounded by a rim part formed of a soft material and located at an edge of the diaphragm; and the rim part intercepts air flowing between the diaphragm and the cell module.

10. The battery pack according to claim 2, wherein the center frame includes:
supply parts including openings communicating with the cross frames and forming the supply flow channels; and
distribution guides to guide air discharged from the openings to the cross frames.

11. The battery pack according to claim 10, wherein the distribution guides include:
a separation plate configured to divide the supply flow channel; and
an interception plate formed at the end of the separation plate to prevent air discharged from the opening from flowing in a length direction of the supply part.

12. The battery pack according to claim 10, wherein the size of at least one of the distribution guides and the openings is increased, as the distribution guides and the openings become distant from the intake duct to inhale external air into a cover.

13. The battery pack according to claim 1, wherein the outlets are formed on surfaces of the frame that are opposite the cell modules.

14. The battery pack according to claim 13, wherein the diameters of the outlets are smaller than a width of the surfaces of the frame that is opposite the cell modules.

15. The battery pack according to claim 1, further comprising a bracket to fix the cell modules to the frame, wherein:
a height of the frame is lower than a height of the cell modules; and
the bracket is configured to bend bent at least once and to fasten to an upper surface of the frame.

16. The battery pack according to claim 1, further comprising:
an internal air duct in which internal air supplied from the return flow channels flows;
an external air duct in which external air introduced into the battery pack through the cover flows;
an exhaust duct configured to guide air introduced from the internal air duct to the outside of the cover; and
an intake duct configured to guide at least one of internal air discharged from the internal air duct and external air discharged from the external air duct to the frame.

17. The battery pack according to claim 16, further comprising a flow channel switching unit configured to connect the internal air duct and the intake duct so as to connect the return flow channels and the supply flow channels.

* * * * *